United States Patent [19]

Fukahori et al.

[11] 4,408,859
[45] Oct. 11, 1983

[54] SPEED GOVERNOR FOR CAMERA

[75] Inventors: Hidehiko Fukahori, Yokohama; Tomonori Iwashita, Fuchu; Katsunori Nakamura, Kawasaki, all of Japan

[73] Assignee: Canon Kabushiki Kaisha, Tokyo, Japan

[21] Appl. No.: 333,293

[22] Filed: Dec. 22, 1981

[30] Foreign Application Priority Data

Dec. 29, 1980 [JP] Japan ............................. 55-189239
Dec. 29, 1980 [JP] Japan ............................. 55-189240
Dec. 29, 1980 [JP] Japan ............................. 55-189241

[51] Int. Cl.³ ............................................. G03B 9/06
[52] U.S. Cl. .................................. 354/274; 354/202; 354/271
[58] Field of Search ............... 354/152, 230, 237, 238, 354/252, 256, 274, 271, 272, 202

[56] References Cited

U.S. PATENT DOCUMENTS 4,107,705  8/1978  Hashimoto et al. ............... 354/230
4,149,785  4/1979  Takaoka et al. ................... 354/271
4,226,521 10/1980  Kawasaki et al. ................. 354/271
4,290,681  9/1981  Maitani et al. .................... 354/230

Primary Examiner—A. A. Mathews
Attorney, Agent, or Firm—Toren, McGeady and Stanger

[57] ABSTRACT

A speed governor for a camera having a first speed governing means arranged to synchronously drive with an increased speed a driving member which drives a high speed operating member to a predetermined position and a second speed governing means arranged to brake the driving force of the driving member. The operating speed of the driving member is kept at a constant speed by the combined use of the first and second speed governing mean 6 Claims, 12 Drawing Figures

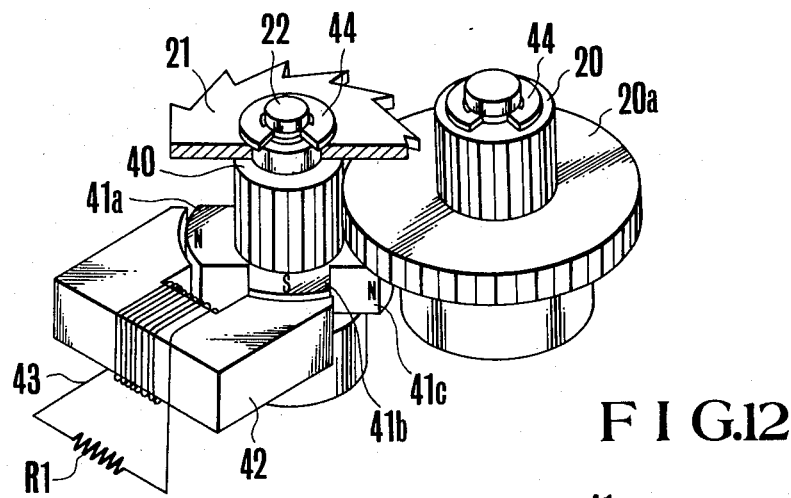
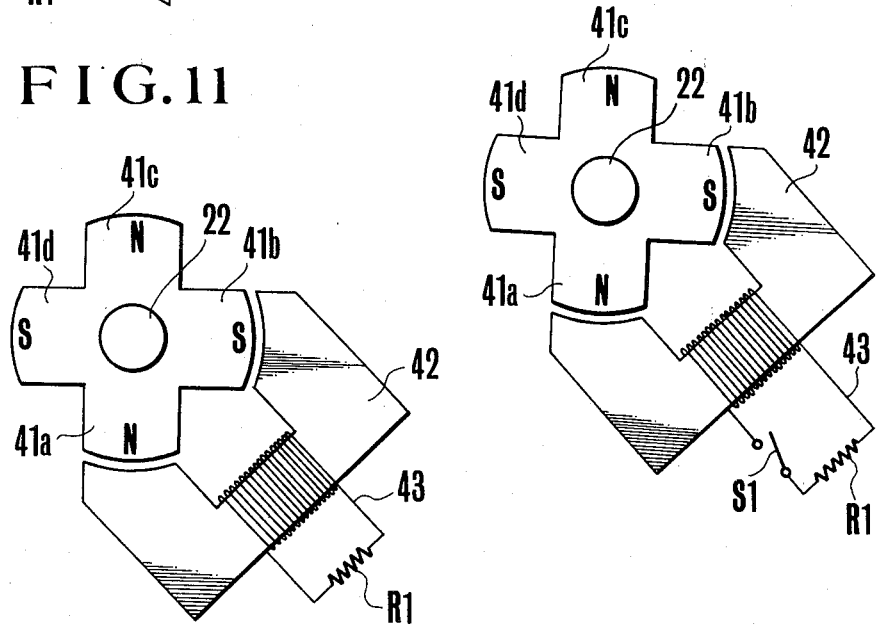

SPEED GOVERNOR FOR CAMERA

BACKGROUND OF THE INVENTION

1. Field of the Invention

This invention relates to a speed governor for a camera and particularly to a speed governor arranged to stabilize the operating speed of a member which operates at a high speed.

2. Description of the Prior Art

The conventionally known speed governors for cameras include slow governors which are arranged to give a predetermined length of time for a self-timer or a slow speed shutter time. Generally, these conventional speed governing devices are arranged to obtain a predetermined length of time by intermittently lowering the speed by means of an anchor. However, they produce a disagreeable sound as they operate. Besides, where they are used for a high speed operating member, the oscillation cycle of the anchor is too short for smoothening intermittent speed variations and exceeds the mechanical strength of the bearing provided for the anchor. Therefore, these conventional speed governors have been not suitable for high speed operating members.

The conventional known devices also include speed governors of the type adapted for a high speed operating member with gears used as the speed governor and arranged to follow a drive source. However, the effect attainable by the use of these cannot be expected to be more than the speed governing effect resulting from the rotational friction of the gears. Even if the predetermined length of time could be obtained from the use thereof, the speed would come to gradually increase during operation. Where the operating member is to be stopped at a desired position, the positional accuracy for bringing the operating member to a stop at the desired position is greatly affected by the variation in the speed of the operating member. For improvement in the stopping positional accuracy, therefore, the operating speed of the high speed operating member must be stabilized. In order to stabilize the operating speed of the high speed operating member, the mere use of the gears as speed governor has been inadequate and requires some further improvement.

SUMMARY OF THE INVENTION

The first object of the present invention is to provide a speed governor for a camera having a first speed governing means arranged to synchronously drive with an increased speed a driving member and a second speed governing means arranged to brake the driving force of the driving member by utilizing a centrifugal force, so that the operation of the driving member can be stabilized by the combined use of the first and second speed governing means.

The second object of the invention is to provide a speed governor for a camera wherein a second speed governing means of the speed governor is arranged to apply a braking force to the driving force of a driving member by utilizing an eccentric oscillating motion.

The third object of the invention is to provide a speed governor for a camera wherein a second speed governing means of the speed governor is arranged to apply a braking force to the driving force of a driving member by utilizing variation in the magnetic flux of a magnet.

These and further objects, features and advantages of the invention will become apparent from the following detailed description of preferred embodiments thereof taken in connection with the accompanying drawings.

BRIEF DESCRIPTION OF THE DRAWINGS

FIG. 10 is an oblique view showing, as a third embodiment of the invention, a further speed governing means to be used for the device shown in FIG. 1.

FIG. 11 is a plan view showing the essential parts of FIG. 10.

FIG. 12 is a plan view showing a modification example of the arrangement shown in FIG. 11.

DESCRIPTION OF THE PREFERRED EMBODIMENTS

Figure 1:
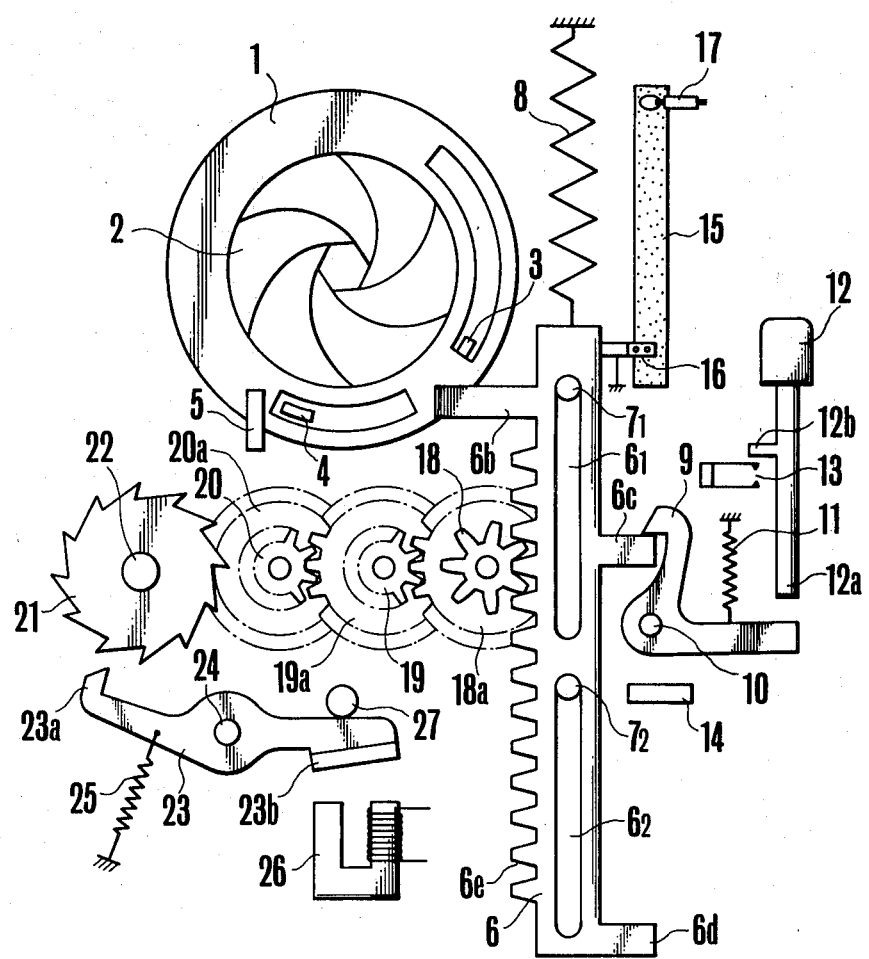
FIG. 1 is a plan view showing a diaphragm control device of a camera related to the present invention.

Referring to FIG. 1 which shows a diaphragm control device of a camera, the device comprises a lens 1; diaphragm baldes 2; preset lever 3; an automatic diaphragm lever 4; a stopping down lever 5 which is arranged to actuate the automatic diaphragm lever 4; and a driving lever 6 which is arranged as driving member to drive the preset lever 3. The driving lever 6 is provided with slots $6_1$ and $6_2$ formed in the middle of the lever 6. Pins $7_1$ and $7_2$ each of which is fixedly mounted on a die cast piece (not shown) are arranged to be in sliding engagement with these slots $6_1$ and $6_2$ in such a manner that the driving lever 6 is movable up and down thereby. On the upper end of the driving lever 6, there is provided a spring 8 which urges the driving lever 6 to move upward. The driving lever 6 is further provided with a diaphragm driving part 6b which is arranged at an upper part of the lever 6 to engage the above stated preset lever 3 for performing diaphragm control; a locking part 6c which is arranged on one side of the lever 6; a charge part 6d which is arranged at the lower end of the lever 6; and a rack 6e which is formed along another side of the lever 6. The locking part 6c engages a lock lever 9 to lock the driving lever 6. The lock lever 9 is rotatably supported by a shaft 10. The shaft 10 is kept by a spring 11 in a position to lock the driving lever 6. A reference numeral 12 indicates a release button having a lock lever actuating part 12a which is arranged to abut on the lock lever 9 and thus to cause it to turn against the force of the spring 11. On one side of the release button 12, there is provided a light measurement switch 13 which is arranged to be actuated by a light measurement switch actuating part 12b of the release button 12.

The driving lever 6 is arranged to be charged by a charge lever 14 in response to the operation of a winding member which is not shown. Along the driving lever 6, there is arranged a variable resistor 15. A moving contact piece 16 which is secured to the driving lever 6 is arranged to be in pressed contact with the variable resistor 15. A lead wire 17 is secured to the upper end of the variable resistor 15. The resistance value of the variable resistor 15 changes accordingly as the abutting position of the moving contact piece 16 on the variable resistor 15 changes.

A speed governing mechanism which is arranged to be synchronously driven with an increased speed by a driving member, i.e. the driving lever 6, is connected to the driving lever 6. The speed governing mechanism includes a gear train linked with the rack 6e of the driving lever 6. More specifically, there is provided a pinion 18 which is arranged to engage the rack 6e of the driving lever 6. The pinion 18 is formed into one unified body with a gear 18a. Following the pinion 18 and the gear 18a, a gear train is formed jointly by a pinion 19, a gear 19a which is formed into one unified body with the pinion 19, a pinion 20 and a gear 20a which is unified with the pinion 20. The last gear of the gear train is linked with a stop wheel 21, which is rotatably supported by a shaft 22. A stopping pawl 23 which is arranged to stop the stop wheel 21 by engaging therewith is supported by a shaft 24. The pawl 23 is provided with a claw part 23a which locks the stop wheel 21 and an armature part 23b which is made of a magnetic material and is arranged to be attracted by a magnet which will be described hereinafter. The stopping pawl 23 is further provided with a spring 25 which constantly urges the claw part 23a to be away from the stop wheel 21. There is provided the above stated magnet 26 which is arranged to cause the claw part 23a to engage the stop wheel 21 by pulling the stopping pawl 23 clockwise against the force of the spring 25 when the magnet is energized by power supply. A numeral 27 indicates a stopper pin.

In the diaphragm control device described in the foregoing, when the release button 12 is depressed, the light measurement switch 13 is closed by the light measurement switch actuating part 12b. With the light measurement switch 13 thus closed, a light measurement circuit which is not shown begins to operate. When the release button 12 is further depressed, the fore end part 12a of the button comes to abut upon one end of the lock lever 9. This causes the lock lever 9 to turn clockwise against the force of the spring 11. The clockwise movement of the lock lever 6 releases the locking part 6e of the driving lever 6 from the locked engagement with the lever 9. Then, the urging force of the spring 8 causes the driving lever 6 to move upward along the slots 6₁ and 6₂ which are in sliding engagement with the pins 7₁ and 7₂. Since the pinion 18 is in engagement with the rack 6e of the driving lever 6, the upward movement of the driving lever 6 causes the stop wheel 21 to rotate through the gear train 18, 18a, 19, 19a, 20 and 20a. Further, the gear train is arranged to give the effect of the conventional gear governor in addition to its function of transmitting the movement of the driving lever 6 to the stop wheel 21 with an increased speed for improvement in the resolution of the stopping position of the driving lever 6. When, the driving lever 6 moves upward, the lens driving part 6b comes to abut on the preset lever 3 and thus lifts the preset lever 3. Since the above stated spring 8 is strong, the preset lever 3 is driven instantaneously by the upward movement of the driving lever 6. The lens 1 is arranged such that the aperture of the diaphragm blades 2 is determined by the position of the preset lever 3. The aperture of the diaphragm blades 2 is stopped down by the rightward movement of the automatic diaphragm lever 4. In the drawing, only the diaphragm blades 2 are illustrated as in a stopped down condition for the sake of illustration. With the driving lever 6 moving upward, the contact piece 16 which is secured to the driving lever 6 also moves while being pressed against the variable resistor 15 and the resistance value of the resistor 15 varies accordingly as the position of the preset lever 3 changes. When the resistance value reaches a predetermined value corresponding to a measured light value, a circuit which is not shown effects power supply to the magnet 26. The armature 23b is attracted by the magnet 26 to cause the stopping pawl 23 to turn clockwise against the force of the spring 25. This in turn causes the claw part 23a to engage the stop wheel 21 and to bring the rotating stop wheel 21 to a stop. Through these actions, a preset aperture value corresponding to the measured light value is determined. Then, when the automatic diaphragm lever 5 is actuated, the aperture is stopped down to a position according to the preset aperture value.

After completion of a release operation stroke which is not shown, there takes place a winding operation. Then, in response to the movement of a winding member which is not shown, the charge lever 14 abuts on the charge part 6d of the driving lever 6 to cause the driving lever 6 to move downward against the force of the spring 8. The lever 6 thus comes back to a predetermined position after the lock lever 9 and the locking part 6e have been caused to engage with each other.

Figure 2:
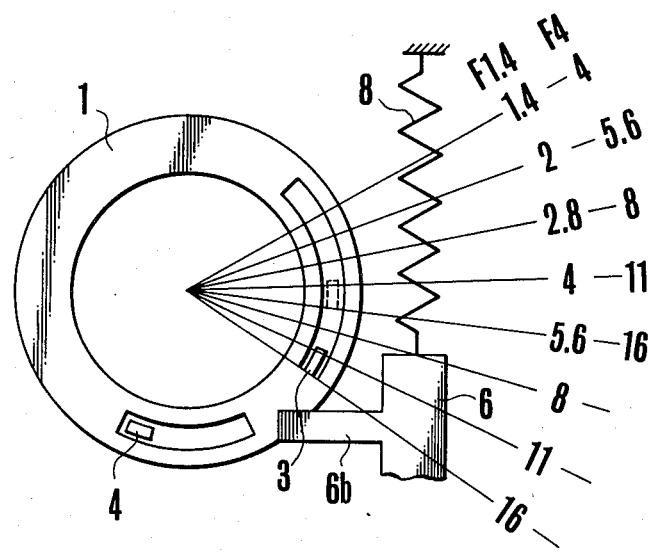
FIG. 2 is an illustration of the relation of a lens to a driving lever shown in FIG. 1.

As shown in FIG. 2, the position of the above stated preset lever 3 varies with the difference of one lens from another in the number of stop steps. As shown, even where the minimum aperture value remains the same, the awaiting position of the preset lever 3 varies if the full-open F number of one lens differs from another. Accordingly, the extent to which the driving lever 6 moves without any load varies with the lens in use.

In accordance with the present invention, there is further provided a second speed governing means in addition to the speed governing mechanism which consists of the above stated gear train. In the first embodiment of the invention which is as illustrated in FIGS. 3 and 4, a means for braking the driving force of the driving lever by utilizing a centrifugal force is employed as the second speed governing means.

Figure 3:
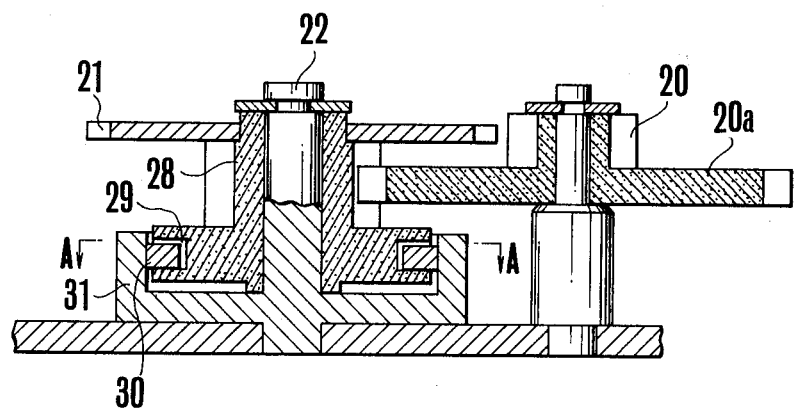
FIG. 3 is a sectional view showing, as a first embodiment of the invention, a speed governing means to be used for the diaphragm control device shown in FIG. 1.

Referring to FIG. 3, there is provided a governor arrangement 30 which is arranged at a governor receiving part 29 which is formed into one unified body with the boss 28 of the stop wheel 21 shown in FIG. 1. The governor arrangement 30 is provided with a governor sliding part 31 which is formed coaxially with and in one unified body with a fixed shaft 22 which is supporting the stop wheel 21. Referring now to FIG. 4, when the driving lever 6 which is described in the foregoing is released from a locked state, the boss 28 of the stop wheel is caused to rotate with an increased speed through the above stated gear train. The rotation of the stop wheel in turn causes the governor 30 to rotate together with the boss 28 of the stop wheel. The governor arrangement 30 consists of three governor members for the purpose of balancing. A centrifugal force corresponding to the square of the speed of rotation pushes the governor arrangement 30 against the above stated governor sliding part 31 in such a way as to keep the rotation of the stop wheel 21 at a constant speed. This arrangement in combination with the effect of the gear train 18, 18a, 19, 19a, 20 and 20a as gear governor brings about an overall speed governing effect which gives a characteristic as represented by a full line curve in FIG. 5.

Figure 5:
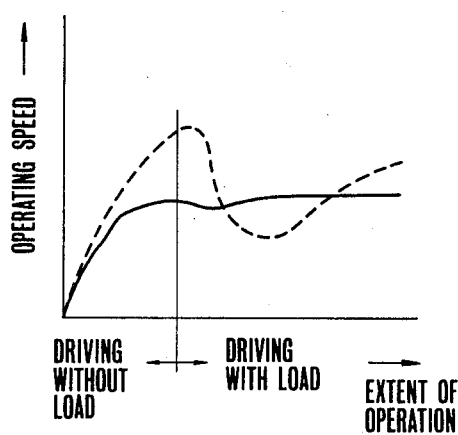
FIG. 5 is a graph showing variations in the driving speed of a driving member shown in FIG. 1.

FIG. 5 shows variations in the operating speed of the driving member. The operating speed is shown on the axis of ordinate and the extent of operation on the axis op abscissa. The variation in the operating speed of the conventional device is as represented by a broken line. A full line represents the variation in the stable operating speed attained by the speed governing means according to the present invention. As shown, where the speed governing means of the present invention is not provided, the operating speed quickly rises during a period of driving without any load after the start of the driving operation and before an actual driving action of the driving member. When the actual driving action of the driving member begins, the load of the driving member causes a sudden decrease in the operating speed and then the speed gradually increases. With the speed governing means of the present invention provided on the other hand, although the rise characteristic immediately after the start is about the same as the conventional device without the speed governing means of the present invention, the operating speed is quickly stabilized at a high speed. Next, since the speed does not much increase as compared with a device without the invented speed governing means after imposition of a load on the driving member, the speed does not vary much so that the driving operation can be carried out at a nearly constant speed. In bringing the driving member to a stop, it is inevitable to have a certain degree of time lag produced at a stopping member. Therefore, stopping at a point of high speed and stopping at a low speed point result in different degrees of accuracy with respect to the stopping position. However, where the operating speed is constant, the stopping position remains almost unvaried wherever stopping is effected. Accordingly, since the operating speed can be stabilized at a high speed with the invented speed governing means used, stopping can be instantly effected at an arbitrary position. Besides, the use of the invented speed governing means provides quieter operation.

Figure 4:
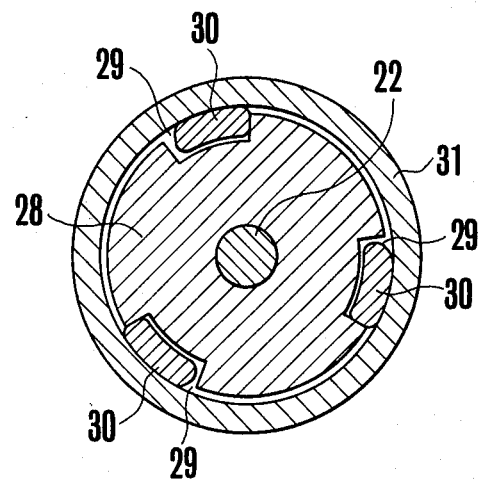
FIG. 4 is a sectional view taken on line A—A of FIG. 3.
Figure 6:
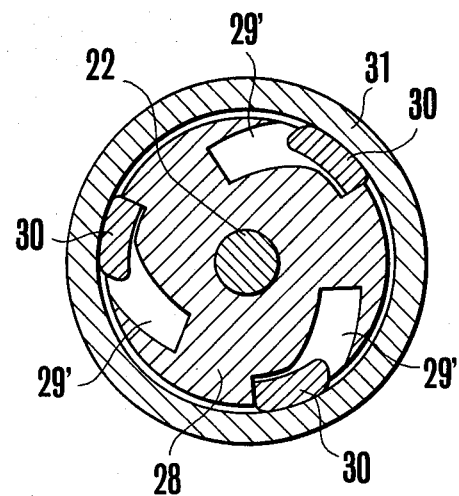
FIG. 6 is a sectional view showing a modification example of the speed governing means shown in FIGS. 3 and 4, the modification example being shown as under a condition of driving a diaphragm.
Figure 7:
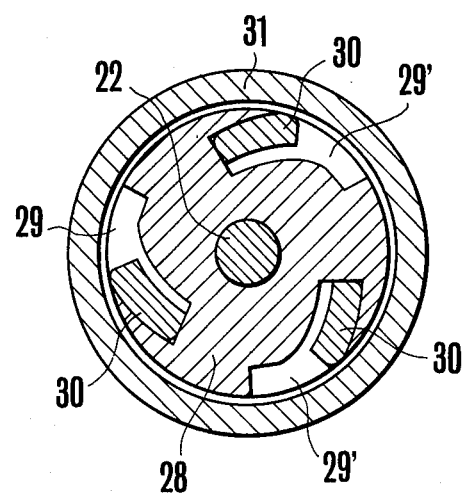
FIG. 7 is a sectional view showing the same modification example of FIG. 6 as under a charging condition.

A modification example of the second speed governing means shown in FIG. 4 is as shown in FIGS. 6 and 7. FIG. 6 is a plan view showing the second speed governing means, as under a diaphragm driving condition in a sectional view taken along the line A—A of FIG. 3. FIG. 7 is a plan view showing the second speed governing means as under a charging condition. In this example, the second speed governing means is arranged not to produce any braking force when the driving member is charged. In other words, at the time of diaphragm driving as shown in FIG. 6, the governor 30 is pushed against the sliding part 31 by a centrifugal force corresponding to the square of the rotation speed and thus produces a braking force in the same manner as in the first embodiment. However, when the operation of the camera shifts to a winding operation after completion of the release operation thereof, the driving lever 6 is charged by the charge lever 14 in a direction opposite to the diaphragm driving direction against the force of the spring 8. Then, through the gear train, the boss 28 of the stop wheel is rotated clockwise in a direction opposite to the diaphragm driving direction. The governor receiving part 29' in this example is in a shape having a helical escape extending toward the center in a counterclockwise direction. Accordingly, at the time of charging, the clockwise rotation of the boss 28 of the stop wheel induces the governor 30 to move toward the center along the helical escape of the receiving part 29'. Under the charging condition, therefore, the governor is not pushed against the governor sliding face 31 and produces no braking force.

Figure 8:
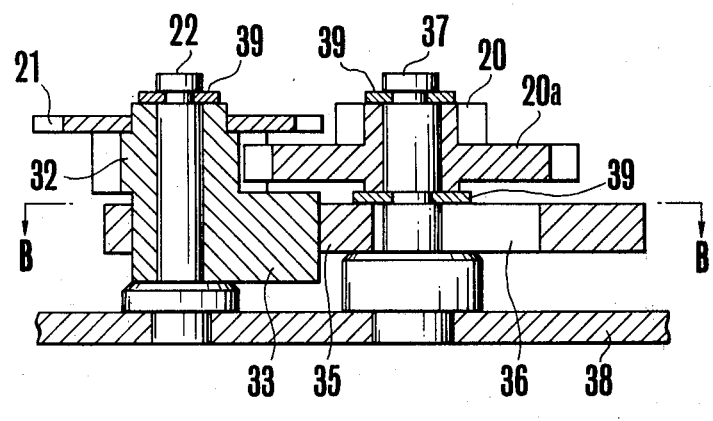
FIG. 8 is a sectional view showing as a second embodiment of the invention, another speed governing means to be used for the device shown in FIG. 1.
Figure 9:
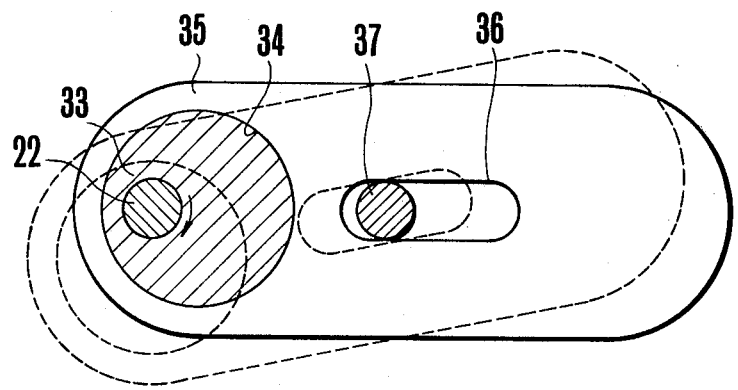
FIG. 9 is a sectional view taken on line B—B of FIG. 8.

A second embodiment of the invention is as shown in FIGS. 8 and 9. In this case, the speed governing mechanism consisting of the gear train as shown in FIG. 1 is combined with a second speed governing means which is arranged to brake the driving force of a driving member by utilizing an eccentric oscillating motion. The second embodiment includes an eccentric part 33 which is formed into one unified body with the boss 32 of the stop wheel 21 arranged to be driven by the speed governing mechanism consisting of the gear train and a governor 35 which is provided with a round hole 34 arranged to have the eccentric part 33 fitted therein. The governor 35 is further provided with an elliptical hole 36. This elliptical hole 36 is arranged to have a fixed shaft 37 fitted therein. The fixed shaft 37 rotatably supports gears 20 and 20a which engage the gear of the stop wheel 21. Further, in the drawing, a reference numeral 38 indicates a supporting plate which supports each part of the embodiment and 39 indicates rings provided for preventing parts from slipping out.

In FIGS. 1, 2, 8 and 9, when the driving lever 6 is released from the locked state, the boss 32 of the stop wheel 21 is caused to rotate with an increased speed through the gear train. Then, the above stated eccentric part 33 also rotates together with the boss of the stop wheel. This causes the center of the round hole 34 having the eccentric part 33 fitted therein rotate on the shaft 22 of the stop wheel along a locus the radius of which corresponds to the degree of eccentricity of the eccentric part 33. Further, with the shaft 37 fitted in the elliptical hole 36 of the governor 35, the elliptical hole 36 slides on the shaft 37. Referring to FIG. 9, when the boss 32 of the stop wheel rotates 90°, the governor 35 moves from a position indicated by a full line to a position indicated by a broken line. The governor thus does not make a mere oscillating motion but makes a smooth motion continuously changing the direction thereof, so that an evenly levelled braking force can be obtained. The effect of the gear train 18, 18a, 19, 19a, 20 and 20a as gear governor is combined with the speed governing effect of the governor 35 in this manner to give the characteristic as represented by the full line curve of FIG. 5.

A third embodiment of the invention is as shown in FIGS. 10 and 11. In the third embodiment, the speed governing mechanism consisting of the gear train as shown in FIG. 1 is combined with a second speed governing means which is arranged to brake the driving force of a driving member by utilizing variation in the magnetic flux of a magnet.

Referring to FIGS. 10 and 11, the third embodiment includes a gear 40 which is formed into one unified body with the stop wheel 21. The gear 40 engages the gear 20a described in the foregoing. A permanent magnet having a plurality of magnetic poles 41a, 41b, 41c and 41d is fixedly arranged into one unified body with the gear 40 of the stop wheel. The embodiment further includes a magnet yoke 42; a magnet coil 43; a resistor R1 which is disposed at the magnet coil 43; and a retaining ring 44.

In the third embodiment, since the magent having the plurality of N and S poles 41a, 41b, 41c and 41d is fixedly arranged in one unified body with the gear 40 of the stop wheel, when the driving lever 6 is unlocked, the gear 40 of the stop wheel is caused to rotate at an increased speed through the gear train to cause thereby the poles 41a, 41b, 41c and 41d to rotate together with the gear 40 of the stop wheel. Accordingly, the variation of N and S poles causes the magnet coil 43 to generate an alternating current. Then, the resistor R1 disposed at the coil 43 consumes this alternating current as heat energy to produce a braking force corresponding to the rotating speed of the gear 40 of the stop wheel.

The third embodiment of the invention in this manner gives the characteristic as represented by the full line curve of FIG. 5 by virtue of an overall effect resulting from the combination of the effect of a gear train consisting of gears 40, 18a, 19, 19a, 20 and 20a and the effect of the speed governing means consisting of the permanent magnet and the yoke with the coil.

FIG. 12 shows a modification of the second speed governing means shown in FIGS. 10 and 11. In this modification, there is provided a speed governing effect selection switch S1 which is disposed between the coil 43 and the resistor R1. The switch S1 turns off upon completion of a release action and turns on upon completion of a winding action. For example, the switch S1 turns off in response to the returning action of a mirror which is not shown and turns on in response to the action of a winding diaphragm claw which is not shown but is arranged to act upon completion of a winding action. Accordingly, under the winding completed condition as shown in FIG. 1, the speed governing effect selection switch S1 is on. Where a diaphragm driving operation is to be performed in response to a depressing operation on the release button 12, this modification gives the same speed governing effect as in the third embodiment. At the commencement of a winding action after completion of a release action, the speed governing effect selection switch S1 is off; the charge lever 14 charges the driving lever 6 in the direction opposite to the diaphragm driving direction against the force of the spring 8; and the above stated magnetic poles 41a, 41b, 41c and 41d and rotated through the gear train. However, since the magnet coil 43 is opened by the switch S1, there obtains no speed governing effect.

In accordance with the present invention, as described in detail in the foregoing, the second speed governing means which is arranged to brake the driving force of the driving member is used in combination with the speed governing mechanism consisting of a gear train.

With the invented speed governing device employed, the speed of the driving member can be kept unvarying to increase the accuracy in respect to the stopping position to a great extent. Since the speed governing means is disposed in the speed increased part, the speed governing response speed is high. Therefore, a stable characteristic can be obtained despite the variation in the no load driving distance as shown in FIG. 2. Besides, the smooth, continuous operation of the invented speed governing device does not produce a noisy sound. Further, in accordance with the invention, the speed governing device also can be arranged to give a speed governing effect during a driving operation and to produce no speed governing effect at the time of charging, so that, at the time of charging, the winding torque of the camera can be kept unaffected by the speed governing device.

While each of the embodiments has been described as applied to a diaphragm control device which is in a shutter preference automatic exposure mode, the speed governing device according to the present invention is not limited to such an application but is also applicable to other arrangement to bring a high speed operating member to a stop at a desired position for an adequate operation of a camera such as an automatic focusing device, ect.

While specific embodiments of the invention have been shown and described in detail to illustrate the application of the inventive principles, it will be understood that the invention may be embodied otherwise without departing from such principles.

What is claimed is:

1. A speed governing device for a camera, said device comprising:
   a moving member capable of being moved from an initial position thereof to a predetermined position;
   a driving member for actuating said moving member, said driving member being arranged to be driven in association with a release action of the camera;
   a first speed governing means interlocked with said driving member, said first speed governing means being arranged to synchronously drive said driving member with an increased speed; and
   a second speed governing means interlocked with said first speed governing means, said second speed governing means being arranged to stabilize the driving speed of said driving member in cooperation with said first speed governing means by braking the driving force of said driving member, said second speed governing means utilizing an eccentric oscillating motion in applying a braking force to said driving member.

2. A speed governing device for a camera comprising:
   a moving member capable of being moved from an initial position thereof to a predetermined position;
   a driving member for actuating said moving member, said driving member being arranged to be driven in association with a release action of the camera;
   a first speed governing means interlocked with said driving member, said first speed governing means being arranged to synchronously drive said driving member with an increased speed; and
   a second speed governing means interlocked with said first speed governing means, said second speed governing means adding a braking force to said driving member by utilizing changes of magnetic flux of a permanent magnet so as to stabilize the driving speed of said driving member together with said first speed governing means, said second speed governing means having a switch arranged to prevent said second speed governing means from applying any braking force to said driving member when said driving member is charged.

3. A speed governing device according to claim 2, wherein said first speed governing means includes a gear train.

4. A speed governing device according to claim 3, wherein said moving member is used for determining the aperture value of a diaphragm.

5. A speed governing device for a camera comprising:

a moving member capable of being moved from an initial position thereof to a predetermined position;

a driving member for actuating said moving member, said driving member being arranged to be driven in association with a release action of the camera;

a first speed governing means interlocked with said driving member, said first speed governing means having a gear train which is arranged to synchronously drive said driving member with an increased speed; and a second speed governing means interlocked with said gear train, said second speed governing means having braking means for braking the driving force of said driving member by utilizing a centrifugal force, said second speed governing means being arranged to stabilize the driving speed of said driving member in cooperation with said first speed governing means, said braking means adding no braking force to said driving means due to its reverse rotation when said driving means is charged.

6. A speed governing device according to claim 5, wherein said braking means has a governor which is arranged to apply a braking force to a gear of said gear train by utilizing a centrifugal force when said gear rotates.

* * * * *